Patented May 5, 1925.

1,536,253

UNITED STATES PATENT OFFICE.

HARRY M. WEBER, OF MONTCLAIR, NEW JERSEY, ASSIGNOR TO ELLIS-FOSTER COMPANY, OF MONTCLAIR, NEW JERSEY, A CORPORATION OF NEW JERSEY.

PREMATURELY-CURED PLASTIC MATERIAL AND PROCESS OF MAKING SAME.

No Drawing.   Application filed April 8, 1924. Serial No. 705,124.

*To all whom it may concern:*

Be it known that I, HARRY M. WEBER, a citizen of the United States, and a resident of Montclair, in the county of Essex and State of New Jersey, have invented certain new and useful Improvements in Prematurely-Cured Plastic Material and Processes of Making Same, of which the following is a specification.

This invention relates to a prematurely-cured plastic material and to the process of making same and in general to making molding compositions in a prematurely-curing state and molding these by a special procedure to form articles of good strength, surface finish and other desired charactertistics.

The invention will be described from the standpoint of the one-stage process of making molding compositions from resins which have the property of hardening or curing in the mold and for this purpose compositions made from magnesium phenate or other phenate and formaldehyde will be used for such illustrative purposes. It should be understood however at the outset that the invention is not limited to such one-stage process nor to the employment of magnesium phenate or phenates of the alkaline earths but also is applicable to products derived from phenol and formaldehyde made in other ways as for example by the method of Baekeland employing less than one-fifth of a mol. of a basic catalyst or to methods employing two stages of preparation and the application of hexamethylenetetramine as a hardening agent.

Speed of molding is an important desideratum in commercial operation. The labor cost of molding is considerable and any means which will shorten the time the molding composition is in the press represents a saving. If resins which have the property of hardening or curing in the mold are increased in sensitiveness or setting speed beyond a certain point the difficulty of what may be termed prematurely curing or prematurely setting arises. As the particles of the composition first subjected to heat in the mold move along the hot surface setting may occur prematurely before the entire mass has become sufficiently plastic and melted or run together to make surface having a homogeneous appearance. When such premature curing occurs it usually is at the edges or corners of the molded article and usually is evidenced by a white or yellow mealy appearance and by loss of strength in such prematurely-cured parts. Hence there is a limitation to the rate of curing controlled by the degree of flowability.

In the present invention it is an object to make a prematurely-cured molding composition and to mold articles therefrom without the difficulties noted above. This is accomplished by pre-forming or cold molding a prematurely-curing composition which may be in a substantially powdered condition and then subjecting to heat in a press to cause the particles to flow together and set or cure to the finished stage. In this way a shortening of the time of molding is secured and in some cases this may amount to from a twenty-five per cent to forty per cent decrease in the time of molding.

Several illustrations will make clear the points I have noted.

For example 150 parts by weight of ordinary coal tar acids were mixed with 180 parts of formaldehyde and magnesium oxide mixture, made by grinding in a ball mill 30 parts of magnesium oxide and 150 parts of ordinary aqueous formaldehyde of approximately 40 per cent strength, the mixture was boiled for 20 minutes then 6½ parts of nigrosine was added, 495 parts of wood flour were impregnated with the solution and the mixture was dried in a vacuum to a temperature rising to 75° C. The vacuum was 25–28″ vacuum gauge. During this preparation the resin formed had become very sensitive to heat. On molding at about 160° C. articles were obtained the edges of which were white and mealy. However on pre-forming the article in the cold employing 4000 pounds pressure to shape it in the mold and afterwards subjecting the shaped material at 1500 pounds pressure to a temperature of 160° C. the article obtained did not have any overcured edges but was hard and uniform throughout. In this composition a very high proportion of wood flour filler was used which renders the difficulty of molding even greater yet the pre-formed or pre-shaped article molded without difficulty and without flaws.

In another case 440 parts by weight of metaparacresol and 480 parts of magnesium oxide-formaldehyde mixture (400 parts formaldehyde, 80 parts magnesium oxide) were heated at 70° C. for 50 minutes, ½ part of nigrosine and 500 parts of wood flour incorporated and the composition dried in vacuo at a temperature reaching 97° C. This composition was prematurely-cured that is it was so sensitive to heat that on placing in the mold under average working conditions the edges of the molded article exhibited a mealy appearance. By pre-forming the article in the cold and transferring to a hot mold articles were obtained at 160° C. and 1000 pounds pressure which were entirely satisfactory.

Again the same composition as above heated at 70° C. for 40 minutes and dried up to 90° C. in vacuo was prematurely-cured when the powder was directly hot molded but on pre-forming in the cold and then hot molding good results were obtained.

In case any adhesion to the mold occurred I found it could be remedied by dusting the surface thereof with finely ground aluminum palmitate before introducing the pre-formed article.

A further illustration is a composition prepared from 260 parts by weight of meta-paracresol, 260 parts of aqueous formaldehyde and 72.8 parts of dolomitic hydrated lime. This was heated at 70° C. for 20 minutes and incorporated with 15 parts lamp black and 500 parts wood flour. The composition was dried in vacuo to 75° C. This composition was found to be prematurely-cured, that is the heating and drying of the composition of this character had made it so sensitive that contact with the hot mold caused setting before the mold could be closed and pressure applied to bring about flowing and heating in the ordinary way. On pre-forming in the cold and putting into a hot mold and pressing an article having a good surface finish resulted.

I have used compositions made from cresol in the foregoing illustrations because I have found these more difficult to manage than those from phenol but it should be understood that compositions made from any phenolic body with formaldehyde or any other aldehyde or mixtures of these with or without hexamethylenetetramine or other substances employed as hardening agents, and likewise other resins having the property of hardening in the mold, for example certain products from urea and formaldehyde, all such products are included within the scope of my invention in so far as it relates to securing high speed of molding, that is shortening the molding time by shaping the molding composition in the cold to approximately resemble the finished molded article and then subjecting such pre-formed article to pressure in a hot mold to cause flowing and setting. In a further modification of the method the prematurely-curing material may be tableted and the tablets introduced into the mold in sufficient quantity to make an adequate charge. In many cases the tableted prematurely-curing material will flow to better advantage than the loose powder. The prematurely curing of molding composition and tableting it so that it is densified into pellets forms another phase of the present invention.

In recapitulation it may be stated that my invention includes the process of making plastic material capable of setting in a hot mold which comprises advancing the reaction in preparing the resin to make material which in the powdered form under heat and pressure is prematurely-curing prior to coalescence and pre-shaping such prematurely-curing material in the cold to form an article roughly resembling the desired finished product and then hot pressing such pre-shaped article. It also includes pre-formed, prematurely-cured molding composition which is capable of setting when hot pressed to form a well finished article. Furthermore the invention embraces a prematurely-curing and pre-shaped molding composition and specifically a molding composition containing a binder having the property of hardening when heated which composition is so sensitive to heat that on hot pressing in powdered form premature curing results with formation of poorly defined edges such composition being adapted for molding purposes by shaping under pressure in the cold prior to hot pressing.

What I claim is:—

1. The process of making a plastic article capable of setting in a hot mold which comprises advancing the reaction in preparing the resin to make material which in the powdered form under heat and pressure is prematurely-cured prior to coalescence and pre-shaping such prematurely-curing material in the cold to form an article roughly resembling the desired finished product and then hot pressing such pre-shaped article.

2. Prematurely-curing molding composition which is capable of setting when hot pressed to form a well finished article.

3. A prematurely-curing and pre-shaped article capable of being molded.

4. A molding composition containing a binder having the property of hardening when heated which composition is so sensitive to heat that on hot pressing in powdered form premature curing results with formation of poorly defined edges such composition being adapted for molding purposes by shaping under pressure in the cold prior to hot pressing.

HARRY M. WEBER.